United States Patent
Mizutani

(10) Patent No.: US 9,129,209 B2
(45) Date of Patent: Sep. 8, 2015

(54) PRINTER HAVING PRINT DATA GENERATION TECHNIQUE FOR FACILITATING PRINTING USING SHORT DISTANCE WIRELESS COMMUNICATION

(71) Applicant: Norio Mizutani, Mie-ken (JP)

(72) Inventor: Norio Mizutani, Mie-ken (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 77 days.

(21) Appl. No.: 13/848,971

(22) Filed: Mar. 22, 2013

(65) Prior Publication Data

US 2013/0258408 A1 Oct. 3, 2013

(30) Foreign Application Priority Data

Mar. 29, 2012 (JP) ................. 2012-076539

(51) Int. Cl.
*G06K 15/02* (2006.01)
*G06F 3/12* (2006.01)
*G03G 15/00* (2006.01)

(52) U.S. Cl.
CPC ........ *G06K 15/1886* (2013.01); *G03G 15/5091* (2013.01); *G06F 3/1238* (2013.01)

(58) Field of Classification Search
CPC ................................. G06K 15/1886
See application file for complete search history.

(56) References Cited

U.S. PATENT DOCUMENTS

| | | | | |
|---|---|---|---|---|
| 5,659,770 A | * | 8/1997 | Yamada | 715/209 |
| 6,724,492 B1 | * | 4/2004 | Iwase et al. | 358/1.14 |
| 2002/0140970 A1 | * | 10/2002 | Kato et al. | 358/1.15 |
| 2003/0101342 A1 | * | 5/2003 | Hansen | 713/167 |
| 2003/0206311 A1 | * | 11/2003 | Konsella et al. | 358/1.14 |
| 2004/0179223 A1 | * | 9/2004 | Iwase et al. | 358/1.15 |
| 2005/0171914 A1 | * | 8/2005 | Saitoh | 705/51 |
| 2006/0092432 A1 | * | 5/2006 | Ferlitsch | 358/1.13 |
| 2006/0274353 A1 | | 12/2006 | Nemoto | |
| 2006/0274355 A1 | * | 12/2006 | Ferlitsch et al. | 358/1.15 |
| 2007/0024892 A1 | * | 2/2007 | Cho | 358/1.14 |
| 2008/0130882 A1 | * | 6/2008 | Hagglund et al. | 358/1.14 |
| 2009/0323112 A1 | | 12/2009 | Kamei et al. | |
| 2011/0032565 A1 | * | 2/2011 | Akimoto et al. | 358/1.15 |
| 2013/0050749 A1 | * | 2/2013 | Yamada | 358/1.15 |

FOREIGN PATENT DOCUMENTS

| | | |
|---|---|---|
| JP | 2004-199362 A | 7/2004 |
| JP | 2007-015372 A | 1/2007 |
| JP | 2010-005877 A | 1/2010 |

* cited by examiner

*Primary Examiner* — Nicholas Pachol

(74) *Attorney, Agent, or Firm* — Scully, Scott, Murphy & Presser P.C.

(57) ABSTRACT

A printer includes: a generation unit sequentially converting each of partial original data of a plurality of pages included in original data designated as a print target by a specific user into each of partial print data in a memory; a supply unit sequentially supplying each of the partial print data to a print execution unit; and a confirmation unit, whenever the partial print data of one page is generated, confirming whether the specific user is present around the printer. When it is not confirmed that the specific user is present around the printer when first partial print data of one page is generated, the supply unit does not supply the first partial print data to the print execution unit, and the generation unit starts to generate second partial print data of another page in the memory.

10 Claims, 8 Drawing Sheets

(FIRST EXEMPLARY EMBODIMENT: CASE A)

(SECOND EXEMPLARY EMBODIMENT)

PRINTER HAVING PRINT DATA GENERATION TECHNIQUE FOR FACILITATING PRINTING USING SHORT DISTANCE WIRELESS COMMUNICATION

CROSS-REFERENCE TO RELATED APPLICATIONS

This application claims priority from Japanese Patent Application No. 2012-076539 filed on Mar. 29, 2012, the entire subject matter of which is incorporated herein by reference.

TECHNICAL FIELD

Illustrative aspects of the invention relate to a printer.

BACKGROUND

There have been disclosed an image forming apparatus which periodically performs short distance wireless communication with a mobile terminal. When it is not possible to perform the short distance wireless communication with the mobile terminal, the image forming apparatus holds print data therein without deleting the print data. After that, when the short distance wireless communication with the mobile terminal becomes possible, the image forming apparatus resumes processing of the print data.

SUMMARY

In the above-described related-art technology, when the print data is configured by a plurality of pages, an output of a printed sheet based on the print data may be delayed.

Therefore, illustrative aspects of the invention provide a technology which can rapidly provide a user with a printed sheet even when print data consists of a plurality of pages.

According to a first illustrative aspect of the invention, there is provided a printer comprising: a print execution unit configured to execute a printing operation; and a control device. The control device is configured to operate as: an original data acquisition unit configured to acquire original data, which is designated as a print target by a specific user and comprises identification information for identifying the specific user; a generation unit configured to sequentially convert each of partial original data of a plurality of pages included in the original data so as to sequentially generate each of partial print data of the plurality of pages in a memory of the printer; a supply unit configured to sequentially supply each of the partial print data of the plurality of pages sequentially generated in the memory to the print execution unit; and a confirmation unit configured to, whenever the partial print data of one page is generated in the memory, confirm whether the specific user is present in the vicinity of the printer by using the identification information. In a first situation where it is confirmed that the specific user is present in the vicinity of the printer when first partial print data, which is the partial print data of one page, is generated in the memory, the supply unit is configured to supply the first partial print data which is stored in the memory to the print execution unit, and the generation unit is configured to generate second partial print data in the memory after the first partial print data is supplied to the print execution unit, the second partial print data being partial print data of one page different from the first partial print data and being generated later than the first partial print data. In a second situation where it is not confirmed that the specific user is present in the vicinity of the printer when the first partial print data is generated, the supply unit is configured not to supply the first partial print data which is stored in the memory to the print execution unit, and the generation unit is configured to start to generate the second partial print data in the memory.

In the second situation, the printer does not supply the first partial print data to the print execution unit. Thus, in the second situation, a printing operation relating to the first partial print data is not executed by the print execution unit. Hence, it is possible to suppress a printed sheet including an image, which is expressed by the original data designated by the specific user, from being output in a situation where the specific user is not present in the vicinity of the printer. Meanwhile, in the second situation, the printer starts to generate the second partial print data in the memory. Therefore, compared to a specific configuration where the second partial print data is not generated in the memory in the second situation, the printer can rapidly supply the second partial print data to the print execution unit when the user shows up in the vicinity of the printer. Hence, the printer can rapidly provide a printed sheet to the specific user, compared to the specific configuration.

According to a second illustrative aspect of the invention, in the second situation, in a specific case where it is confirmed that the specific user is present in the vicinity of the printer when the second partial print data is generated, the supply unit is configured to supply each of the first partial print data and the second partial print data which is stored in the memory to the print execution unit.

According to the above-described configuration, in the specific case, the printer can rapidly supply the first and second partial print data to the print execution unit. Therefore, the printer can rapidly provide a printed sheet to the specific user, compared to the above-described specific configuration.

According to a third illustrative aspect of the invention, in the specific case, the supply unit is configured to supply the second partial print data to the print execution unit after supplying the first partial print data to the print execution unit.

According to the above-described configuration, in the specific case, the printer can supply the first and second partial print data to the print execution unit in an appropriate order.

According to a fourth illustrative aspect of the invention, the confirmation unit is further configured to confirm whether the specific user is present in the vicinity of the printer when an available space in the memory becomes a predetermined threshold value or smaller while each of the partial print data of the plurality of pages is sequentially generated in the memory. In a first case of the second situation where it is confirmed that the specific user is present in the vicinity of the printer when the available space in the memory becomes the predetermined threshold value or smaller while the second partial print data is being generated in the memory, the supply unit is configured to supply the first partial print data which is stored in the memory to the print execution unit, and the generation unit is configured to release an area in the memory, in which the first partial print data is stored, after the first partial print data is supplied to the print execution unit, and then continue to generate the second partial print data in the memory. In a second case of the second situation where it is not confirmed that the specific user is present in the vicinity of the printer when the available space in the memory becomes the predetermined threshold value or smaller while the second partial print data is being generated in the memory, the supply unit is configured not to supply the first partial print data which is stored in the memory to the print execution unit.

According to the above-described configuration, in the first case, the printer supplies the first partial print data to the print execution unit. Therefore, the printer can release an area in the memory and generate the second partial print data in the memory. Meanwhile, in the second case, the printer does not supply the first partial print data to the print execution unit. Therefore, it is possible to suppress a printed sheet including an image, which is expressed by the original data designated by the specific user, from being output in a situation where the specific user is not present in the vicinity of the printer.

According to a fifth illustrative aspect of the invention, the control device is further configured to operate as a transmission unit configured to transmit the first partial print data which is stored in the memory to a server, which is separately configured from the printer, in the second case. The generation unit is configured to release the area in the memory in which the first partial print data is stored, after the first partial print data is transmitted to the server, and then generate the second partial print data in the memory.

According to the above-described configuration, in the second case, the printer transmits the first partial print data to the server. Thus, the printer can release an area in the memory and can generate the second partial print data in the memory.

According to a sixth illustrative aspect of the invention, the control device is further configured to operate as a print data acquisition unit configured to acquire the first partial print data from the server, in a third case where it is confirmed that the specific user is present in the vicinity of the printer when the second partial print data is generated in the memory after the first partial print data is transmitted to the server. In the third case, the supply unit is configured to supply each of the first partial print data which is acquired from the server and the second partial print data which is stored in the memory to the print execution unit.

According to the above-described configuration, in the third case, the printer can appropriately supply the first and second partial print data to the print execution unit.

According to a seventh illustrative aspect of the invention, in the third case, the supply unit is configured to supply the second partial print data to the print execution unit after supplying the first partial print data to the print execution unit.

According to the above-described configuration, in the third case, the printer can supply the first and second partial print data to the print execution unit in appropriate order.

According to an eighth illustrative aspect of the invention, the control device is further configured to operate as a print data acquisition unit configured to acquire the first partial print data from the server, in a fourth case where it is not confirmed that the specific user is present in the vicinity of the printer when the second partial print data is generated in the memory after the first partial print data is transmitted to the server, and it is confirmed that the specific user is present in the vicinity of the printer when the available space in the memory becomes the predetermined threshold value or smaller while third partial print data that is the partial print data of one page different from the second partial print data and to be generated later than the second partial print data is being generated in the memory. In the fourth case, the supply unit is configured to supply each of the first partial print data which is acquired from the server and the second partial print data which is stored in the memory to the print execution unit.

According to the above-described configuration, in the fourth case, the printer can appropriately supply the first and second partial print data to the print execution unit.

According to a ninth illustrative aspect of the invention, in the fourth case, the supply unit is configured to supply the second partial print data to the print execution unit after supplying the first partial print data to the print execution unit.

According to the above-described configuration, in the fourth case, the printer can supply the first and second partial print data to the print execution unit in appropriate order.

According to a tenth illustrative aspect of the invention, the confirmation unit is configured to determine that it is confirmed that the specific user is present in the vicinity of the printer when it is possible to communicate by short distance wireless communication with a mobile terminal carried by the specific user. The confirmation unit is configured to determine that it is not confirmed that the specific user is present in the vicinity of the printer when it is not possible to perform the short distance wireless communication with the mobile terminal.

According to the above-described configuration, the printer can appropriately confirm whether the specific user is present in the vicinity of the printer.

According to an eleventh illustrative aspect of the invention, there is provided a non-transitory computer-readable medium having a computer program stored thereon that, when executed by a computer, causes the computer to perform operations comprising: original data acquisition processing of acquiring original data, which is designated as a print target by a specific user and comprises identification information for identifying the specific user; generation processing of sequentially converting each of partial original data of a plurality of pages included in the original data so as to sequentially generate each of partial print data of the plurality of pages in a memory of the printer; supply processing of sequentially supplying each of the partial print data of the plurality of pages sequentially generated in the memory to a print execution unit; and confirmation processing of, whenever the partial print data of one page is generated in the memory, confirming whether the specific user is present in the vicinity of the printer by using the identification information. In a first situation where it is confirmed that the specific user is present in the vicinity of the printer when first partial print data, which is the partial print data of one page, is generated in the memory, in the supply processing, the computer program causes the computer to supply the first partial print data which is stored in the memory to the print execution unit, and in the generation processing, the computer program causes the computer to generate second partial print data in the memory after the first partial print data is supplied to the print execution unit, the second partial print data being partial print data of one page different from the first partial print data and being generated later than the first partial print data. In a second situation where it is not confirmed that the specific user is present in the vicinity of the printer when the first partial print data is generated, in supply processing, the computer program causes the computer not to supply the first partial print data which is stored in the memory to the print execution unit, and in the generation processing, the computer program causes the computer to start to generate the second partial print data in the memory.

Incidentally, a control method for implementing the printer, a computer program and a computer-readable recording medium having the computer program stored therein are also novel and useful.

DETAILED DESCRIPTION

Figure 1:
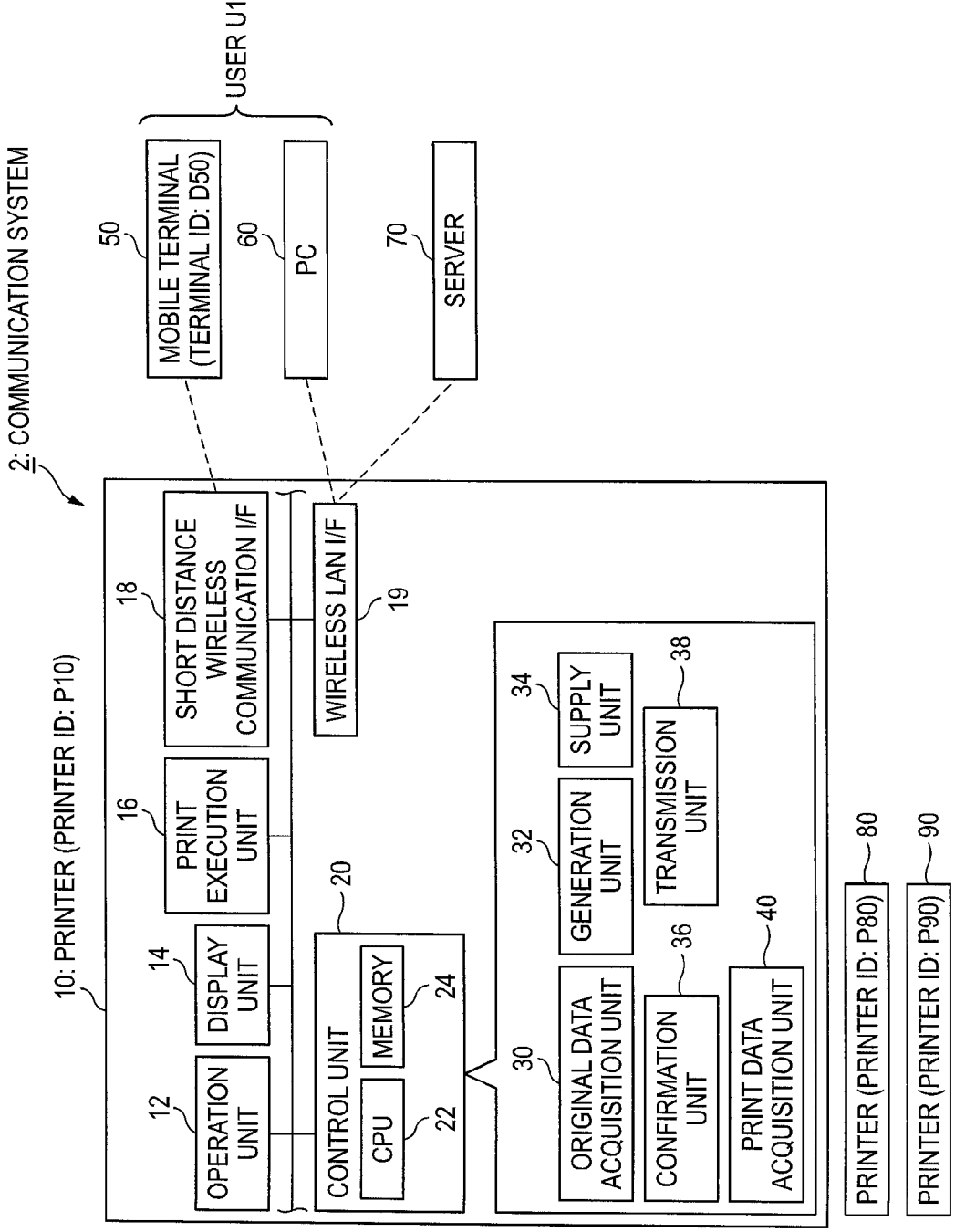
FIG. 1 shows an example of a configuration of a communication system.

Exemplary embodiments of the invention will now be described with reference to the Drawings.
(First Exemplary Embodiment)
As shown in FIG. 1, a communication system 2 includes printers 10, 80, 90, a mobile terminal 50, a PC 60 and a server 70. The printers 10, 80, 90 have the same configuration and are peripheral devices of the mobile terminal 50 and the PC 60. The mobile terminal 50 and the PC 60 are used by a specific user U1. The mobile terminal 50 includes a smart phone, a PDA terminal, a laptop PC, a tablet PC and the like, for example. The printers 10, 80, 90 and the mobile terminal 50 can perform communication with each other by short distance wireless communication (for example, Bluetooth (registered trademark)). Incidentally, the type of the short distance wireless communication is not limited thereto. For example, the invention can also be implemented when infrared communication or NFC (Near Field Communication) is used.

For example, the user U1 brings the mobile terminal 50 close to the printer 10 to thus perform the short distance wireless communication between the mobile terminal 50 and the printer 10. When a distance between the printer 10 and the mobile terminal 50 is within a predetermined distance, the printer 10 and the mobile terminal 50 can perform the short distance wireless communication. When a distance between the printer 10 and the mobile terminal 50 is beyond the predetermined distance, the printer 10 and the mobile terminal 50 are unable to perform the short distance wireless communication.

The PC 60 includes a CPU, a memory, a display and the like, which are not shown. The memory of the PC 60 stores therein a printer driver program for the printer 10. The CPU of the PC 60 uses the printer driver program to thus generate PDL (Page Description Language) data that is data of a print target. The server 70 includes a CPU, a memory and the like, which are not shown. The server 70 is configured to acquire print data from the printer 10 and temporarily store the print data therein.

The printers 10, 80, 90, the PC 60 and the server 70 can perform communication with each other through a wireless LAN and the like. Incidentally, the PC 60 and the server 70 are unable to perform the short distance wireless communication. In a modified embodiment, the printers 10, 80, 90, the PC 60 and the server 70 may perform communication with each other through a wired LAN.

The printers 10, 80, 90 have printer IDs 'P10', 'P80' and 'P90', respectively, and the mobile terminal 50 has a terminal ID 'D50.' The printer IDs and the terminal ID are unique IDs and may be IDs (node names, user names and the like) designated by a user or may be predetermined IDs (MAC addresses and the like).

In this exemplary embodiment, it is assumed that the printers 10, 80, 90, the PC 60 and the server 70 are provided in a specific company, for example. Further, the user U1 (for example, an employee of the specific company) uses the PC 60 and carries the mobile terminal 50. For example, by operating the PC 60, the user U1 can supply the PDL data to the printer 10 through the wireless LAN to thus enable the printer 10 to execute a printing operation.
(Configuration of Printer 10)
The printer 10 includes an operation unit 12, a display unit 14, a print execution unit 16, a short distance wireless interface 18, a wireless LAN interface 19 and a control unit 20. The respective units 12 to 20 are connected to a bus line (a reference numeral thereof is omitted). The operation unit 12 includes a plurality of keys. A user can input a variety of instructions into the printer 10 through the operation unit 12. The display unit 14 is a display for displaying a variety of information. The print execution unit 16 has a print mechanism such as inkjet, laser methods and the like, and is configured to execute a printing operation in response to an instruction from the control unit 20.

The short distance wireless interface 18 is an interface that is used when the control unit 20 performs the short distance wireless communication. The wireless LAN interface 19 is an interface that is used when the control unit 20 uses typical wireless communication (for example, wireless communication based on IEEE802.1 and the like) through the wireless LAN.

Figure 2:
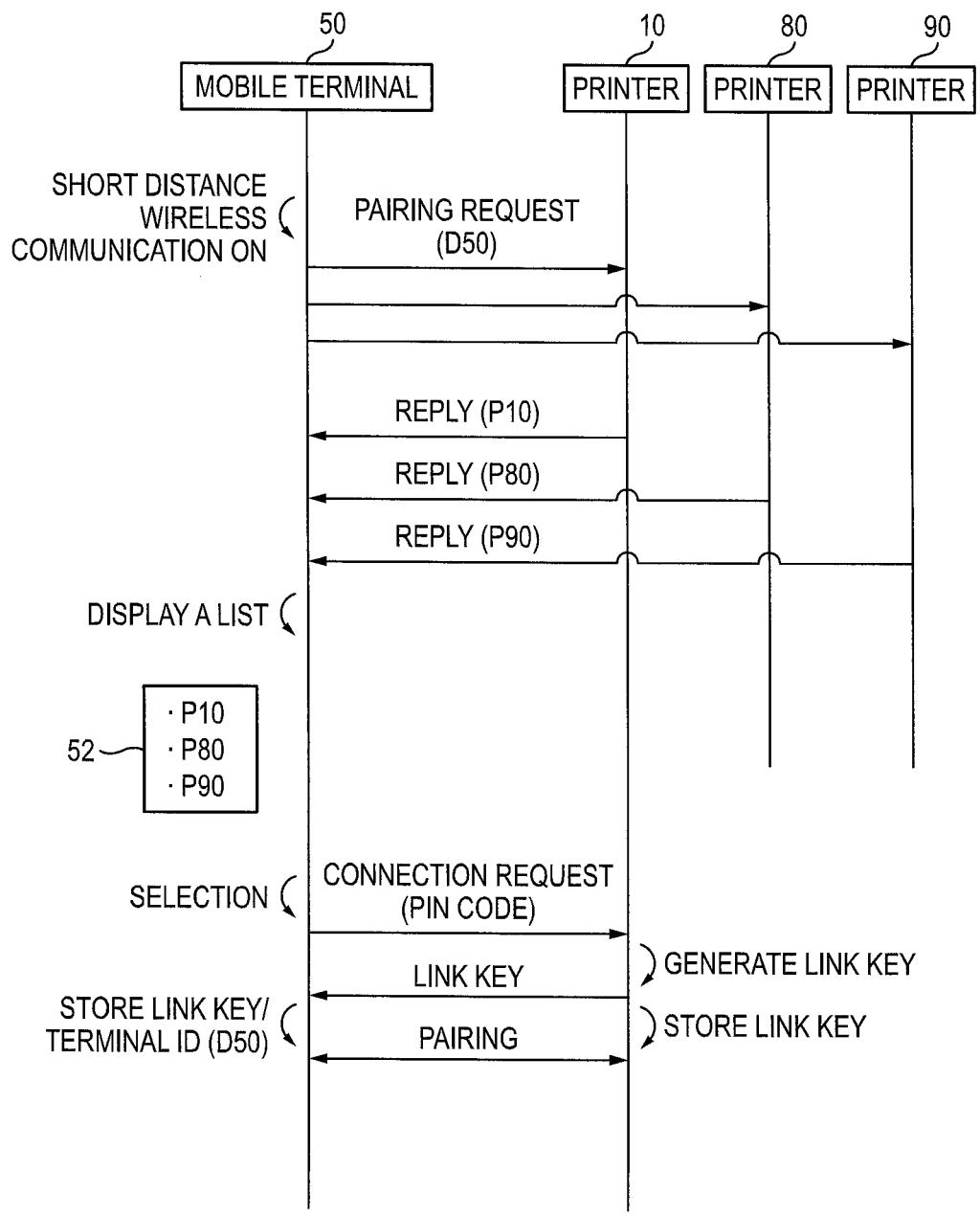
FIG. 2 shows a sequence diagram of pairing processing that is executed between a mobile terminal and a printer.

The control unit 20 includes a CPU 22 and a memory 24. The CPU 22 is configured to execute a variety of processing in response to programs stored in the memory 24. The memory 24 is configured by a ROM, a RAM, a hard disk and the like. The memory 24 is configured to store the programs that are executed by the CPU 22 and data that is acquired or generated while the CPU 22 executes the processing. The CPU 22 is configured to execute the processing in response to the programs, so as to implement respective functions of an original data acquisition unit 30, a generation unit 32, a supply unit 34, a confirmation unit 36, a transmission unit 38 and a print data acquisition unit 40.
(Pairing Processing: FIG. 2)
In the below, pairing processing that is executed between the printer 10 and the mobile terminal 50 will be described with reference to FIG. 2. The printer 10 needs to execute pairing processing in advance as a precondition for executing printer processing (refer to FIG. 3) that will be described later. When the pairing processing of FIG. 2 is executed, a state in which the short distance wireless communication can be performed between the printer 10 and the mobile terminal 50 is established.

As shown in FIG. 2, the user U1 switches a short distance wireless communication function from OFF to ON by operating the operation unit of the mobile terminal 50. When the short distance wireless communication function is switched to ON, the mobile terminal 50 periodically transmits a pairing request signal. The pairing request signal includes the terminal ID 'D50.' The printers 10, 80, 90 that are present within the predetermined distance from the mobile terminal 50 receive the pairing request signal from the mobile terminal 50, respectively. When the printers 10, 80, 90 receive the pairing request signal, respectively, the printers transmit reply signals including the printer IDs 'P10', 'P80' and 'P90' to the mobile terminal 50.

When the mobile terminal 50 receives the reply signals from the printers 10, 80, 90, the mobile terminal 50 displays a device list 52 (refer to FIG. 2) on the display unit of the mobile terminal 50. The device list 52 includes the respective printer IDs that are included in the respective reply signals.

The user U1 can know a device capable of performing the short distance wireless communication with the mobile terminal 50 from the device list 52. The user U1 executes a device selection operation for selecting one device (e.g., printer) from the device list 52. In the example of FIG. 2, the user U1 selects the printer ID 'P10' of the printer 10.

The mobile terminal 50 transmits a connection request signal including a PIN code to the selected printer 10. The PIN code is a code that is used so as to perform the short distance wireless communication between the mobile terminal 50 and the printer 10. The PIN code may be input by a user or may be predetermined.

When the printer 10 receives the connection request signal from the mobile terminal 50, the printer 10 authenticates the PIN code included in the connection request signal. When the authentication is successful, the printer 10 generates a link key by using the PIN code. Then, the printer 10 associates the link key with the terminal ID 'D50' of the mobile terminal 50, stores the same in the memory 24 and transmits the link key to the mobile terminal 50. When the link key is received, the mobile terminal 50 stores the link key in the memory thereof. Thereby, the pairing between the mobile terminal 50 and the printer 10 is completed, so that it is possible to perform the short distance wireless communication between the mobile terminal 50 and the printer 10.

When the user U1 sets the mobile terminal 50 apart from the printer 10, the mobile terminal 50 and the printer 10 are unable to perform the short distance wireless communication. However, when the user U1 moves the mobile terminal 50 into the predetermined distance from the printer 10 in a situation where the pairing between the mobile terminal 50 and the printer 10 is completed, the printer 10 and the mobile terminal 50 can perform the short distance wireless communication without executing the above pairing processing, because the link key has been already stored.

Meanwhile, in the state where the link key is stored in the memory 24 of the printer 10 and in the memory of the mobile terminal 50, the confirmation unit 36 of the printer 10 periodically confirms whether it is possible to perform the short distance wireless communication with the mobile terminal 50. That is, the confirmation unit 36 periodically transmits a pairing request signal including the link key. When the mobile terminal 50 is close to the printer 10 (e.g., when the mobile terminal 50 is present within the predetermined distance from the printer 10), the mobile terminal 50 receives the pairing request signal and transmits a reply signal to the printer 10. On the other hand, when the mobile terminal 50 is not present in the vicinity of the printer 10, the mobile terminal 50 does not receive the pairing request signal, so that it does not transmit a reply signal to the printer 10. When the reply signal is received from the mobile terminal 50, the confirmation unit 36 may determine that it is possible to perform the short distance wireless communication with the mobile terminal 50. When the reply signal is not received from the mobile terminal 50, the confirmation unit 36 may determine that it is not possible to perform the short distance wireless communication with the mobile terminal 50.

Figure 3:
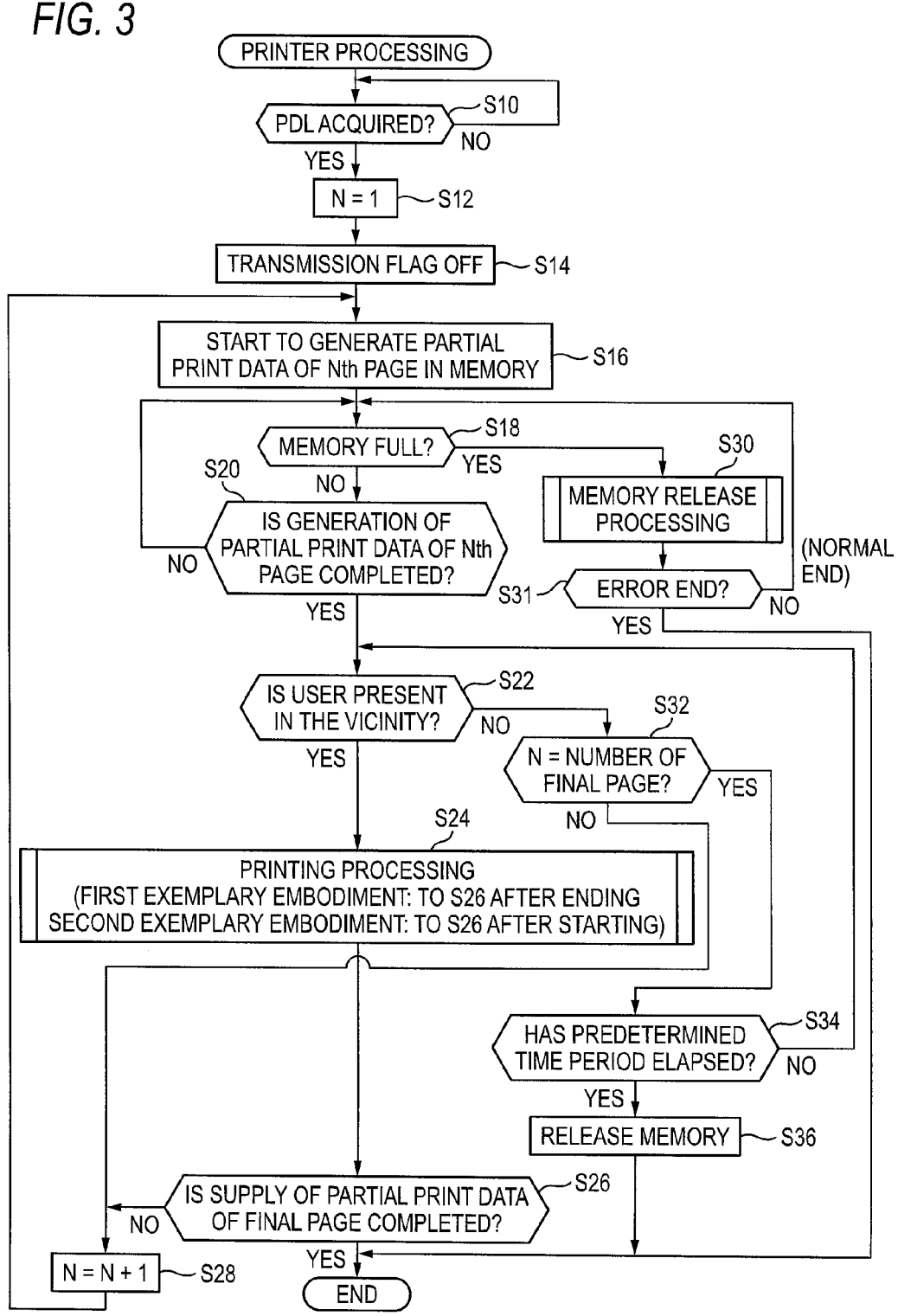
FIG. 3 is a flowchart of printer processing.

(Printer Processing: FIG. 3)

Subsequently, the processing that is executed by the printer 10 will be described with reference to FIG. 3. In the below, an example is described in which the pairing processing (refer to FIG. 2) has been already executed between the printer 10 and the mobile terminal 50.

In S10, the original data acquisition unit 30 monitors whether the PDL data is acquired. The user U1 can designate data (for example, document file, image file and the like) of a print target by operating the operation unit of the PC 60. The PC 60 generates the PDL data (hereinafter, referred to as 'specific PDL data') from the data of the print target by using the printer driver program. The specific PDL data has a format that can be interpreted by the printer 10. Then, the PC 60 transmits the terminal ID 'D50' of the mobile terminal 50, the specific PDL data and identification information (hereinafter, referred to as 'specific PDL identification information') indicating the specific PDL data to the printer 10 via the wireless LAN. Incidentally, the specific PDL data includes partial PDL data of M pages (M is an integer of 1 or larger). Here, the specific PDL identification information includes identification information for identifying the specific PDL data from a plurality of PDL data including the specific PDL data.

When the specific PDL data is acquired from the PC 60 via the wireless LAN interface 19, the original data acquisition unit 30 determines 'YES' in S10. When a result of the determination in S10 is YES, the original data acquisition unit 30 associates the terminal ID 'D50', the specific PDL data and the specific PDL identification information and stores the same in the memory 24. When a result of the determination in S10 is YES, the processing proceeds to S12.

In S12, the generation unit 32 specifies '1' as a value 'N' indicating a processing target page. Then, in S14, the transmission unit 38 stores information indicating 'transmission flag=OFF' in the memory 24. Here, the transmission flag includes information indicating whether partial print data of at least one page (which will be described later) has been transmitted to the server 70. As described later, when the partial print data of at least one page has been transmitted to the server 70, information indicating 'transmission flag=ON' is stored in the memory 24. When the partial print data of at least one page has not been transmitted to the server 70, the information indicating 'transmission flag=OFF' is stored in the memory 24.

Subsequently, in S16, the generation unit 32 initiates generating processing for generating partial print data of Nth page in the memory 24 by using (e.g., by converting) partial PDL data of Nth page, which is included in the specific PDL data acquired in S10. In first S16, the generation unit 32 initiates the generating processing for generating partial print data of a first page in the memory by using (e.g., by converting) partial PDL data of a first page.

Specifically, in the generating processing of S16, the generation unit 32 executes following processing, respectively. First, the generation unit 32 converts the partial PDL data of Nth page into RGB bitmap data of multi-gradations (for example, 256 gradations). Then, the generation unit 32 converts the RGB bitmap data into CMYK bitmap data of multi-gradations (for example, 256 gradations). Then, the generation unit 32 converts the CMYK bitmap data into binary data (data indicating ON/OFF of a dot). In this exemplary embodiment, the binary data is the partial print data of Nth page. Incidentally, in a modified embodiment, the partial print data may be ternary data or larger (for example, quaternary data of dot OFF, large dot ON, middle dot ON and small dot ON). When the partial print data (binary data) of Nth page is supplied to the print execution unit 16, the print execution unit 16 is able to print an image, which is expressed by the partial PDL data of Nth page, on a printing medium in accordance with the partial PDL data of Nth page.

When the generating processing of the partial print data of Nth page is initiated, the generation unit 32 monitors whether the memory is full before the generating processing of the partial print data of Nth page is completed (e.g., before the generation of the partial print data of Nth page is completed), in S18 and S20. When an available space in the memory 24 becomes a predetermined threshold value or smaller before the generating processing of the partial print data of Nth page is completed, the generation unit 32 determines 'YES' in S18. In this case, the control unit 20 executes memory release processing (refer to FIG. 4) of S30.

When the memory release processing of S30 is over, the generation unit 32 determines whether the memory release processing error ends in S31. When the memory release processing error ends, the control unit 20 determines 'YES' in S31 and ends the printer processing. On the other hand, when the memory release processing does not error end (e.g., the memory release processing normally ends), the generation unit 32 determines 'NO' in S31 and returns to S18. In this case, the generation unit 32 resumes (continues) the generating processing of the partial print data of Nth page initiated in S16.

When the generating processing of the partial print data of Nth page using the partial PDL data of Nth page is completed (e.g., the generation of the partial print data of Nth page is completed) while the memory is not full (NO in S18), the generation unit 32 determines 'YES' in S20. In this case, the partial print data of Nth page generated from the partial PDL data of Nth page is stored in the memory 24. At this time, the generation unit 32 associates page number information indicating a page number (Nth page) and the specific PDL identification information with the partial print data of Nth page. Also, when the partial print data of Nth page is partial print data of a final page (e.g., N=M), the generation unit 32 associates final information indicating the partial print data of a final page with the partial print data of Nth page. When a result of the determination in S20 is YES, the processing proceeds to S22.

In S22, the confirmation unit 36 confirms whether the user U1 of the PC 60, which is a transmission source of the specific PDL data, is present in the vicinity of the printer 10. Specifically, in S22, the confirmation unit 36 first specifies the terminal ID 'D50', which is associated with the specific PDL data acquired in S10, from the memory 24. Then, the confirmation unit 36 determines whether it is possible to perform the short distance wireless communication with the mobile terminal 50 having the terminal ID 'D50.' That is, the confirmation unit 36 transmits a pairing request signal, which includes the link key stored in the memory 24 with being associated with the terminal ID 'D50', and determines whether a reply signal is received. When a reply signal is received from the mobile terminal 50, e.g., when the short distance wireless communication with the mobile terminal 50 is possible, the confirmation unit 36 determines that it is confirmed that the user U1 is present in the vicinity of the printer 10. In this case, the confirmation unit 36 determines 'YES' in S22. On the other hand, when a reply signal is not received from the mobile terminal 50, e.g., when the short distance wireless communication with the mobile terminal 50 is impossible, the confirmation unit 36 determines that it is not confirmed that the user U1 is present in the vicinity of the printer 10. In this case, the confirmation unit 36 determines 'NO' in S22. Like this, the printer 10 can appropriately confirm whether the user U1 is present in the vicinity of the printer 10.

Figure 5:
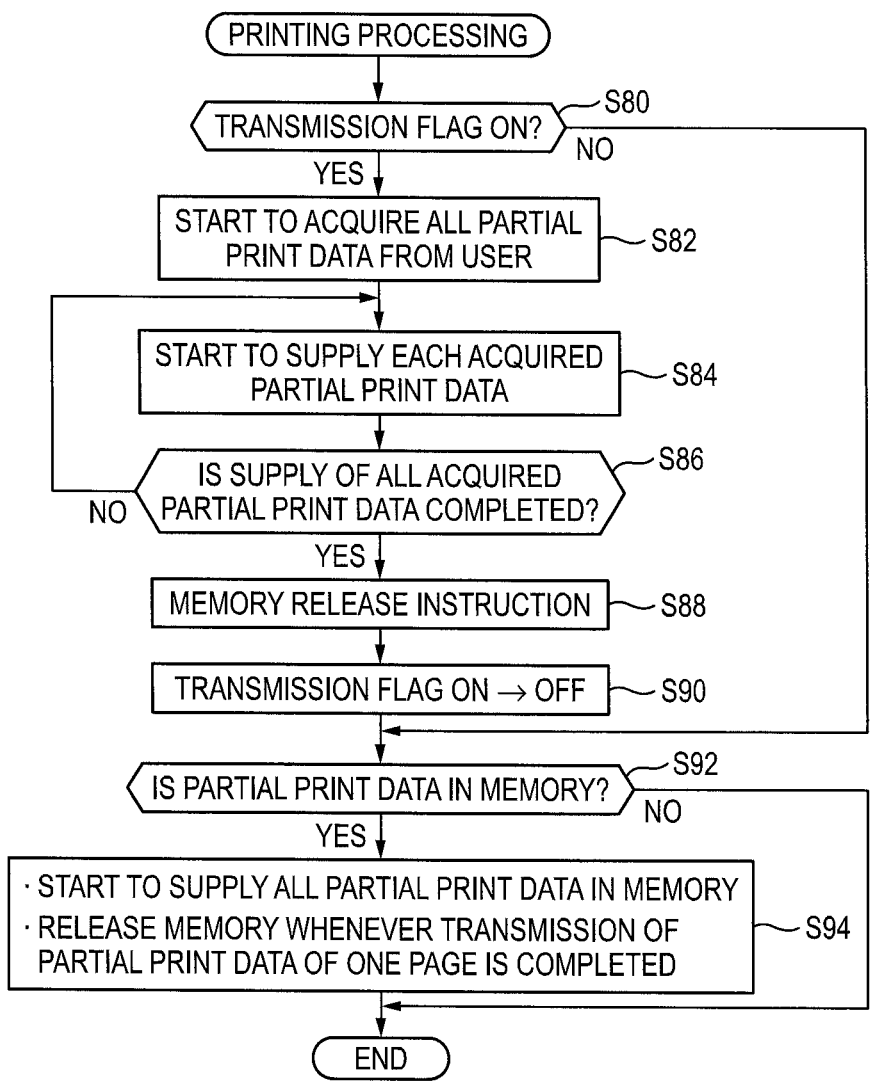
FIG. 5 is a flowchart of printing processing.

When the user U1 is present in the vicinity of the printer 10 (YES in S22), the processing proceeds to S24, and the control unit 20 executes printing processing (refer to FIG. 5).

In this exemplary embodiment, after the printing processing of S24 is over, the processing proceeds to S26. In this exemplary embodiment, the control unit 20 executes so-called sequential processing (refer to FIGS. 6 and 7). That is, the control unit 20 is unable to execute the generating processing of the partial print data and the supply of the partial print data to the print execution unit 16 at the same time. Thus, in this exemplary embodiment, the supply unit 34 executes processing of S26 after the printing processing of S24 is completed.

In S26, the supply unit 34 determines whether the partial print data of the final page (e.g., the partial print data associated with the final information) has been supplied to the print execution unit 16. Specifically, the supply unit 34 determines whether N=M (final page). When a result of the determination in S26 is YES, the printer processing is over. In this case, the supply unit 34 releases an area in which the specific PDL data acquired in S10 is stored. On the other hand, when a result of the determination in S26 is NO, the processing proceeds to S28, and the generation unit 32 increments the current N value in the memory 24 to thus calculate a new N value and then returns to S16.

On the other hand, when the user U1 is not present in the vicinity of the printer 10 (NO in S22), the confirmation unit 36 determines in S32 whether the current N value is a number (e.g., M) of the final page. When the current N value is M, the confirmation unit 36 determines 'YES' in S32 and proceeds to S34. At this time, when a result of the determination in S32 is YES for the first time, the confirmation unit 36 starts a timer and then proceeds to S34. On the other hand, when the current N value is smaller than M, the confirmation unit 36 determines 'NO' in S32 and proceeds to S28. In S28, the generation unit 32 increments the current N value in the memory 24 to thus calculate a new N value and then returns to S16.

In S34, the confirmation unit 36 determines whether a predetermined time period has elapsed after the timer has started. When a result of the determination in S34 is NO, the confirmation unit 36 returns to S22 and again determines whether the user U1 is present in the vicinity of the printer 10. When it is not determined that the user U1 is present in the vicinity of the printer 10 after the timer has started until the predetermined time period has elapsed, the confirmation unit 36 determines 'YES' in S34. In this case, in S36, the supply unit 34 releases the area of the memory 24 in which the respective partial print data is stored, and then ends the printer processing. Like this, in this exemplary embodiment, when the user U1 does not show up in the vicinity of the printer 10 even though the long time has elapsed, 'YES' is determined in S34, so that the respective partial print data is erased from the memory 24. Therefore, it is possible to suppress the situation in which the respective partial print data still remains in the memory 24.

Figure 4:
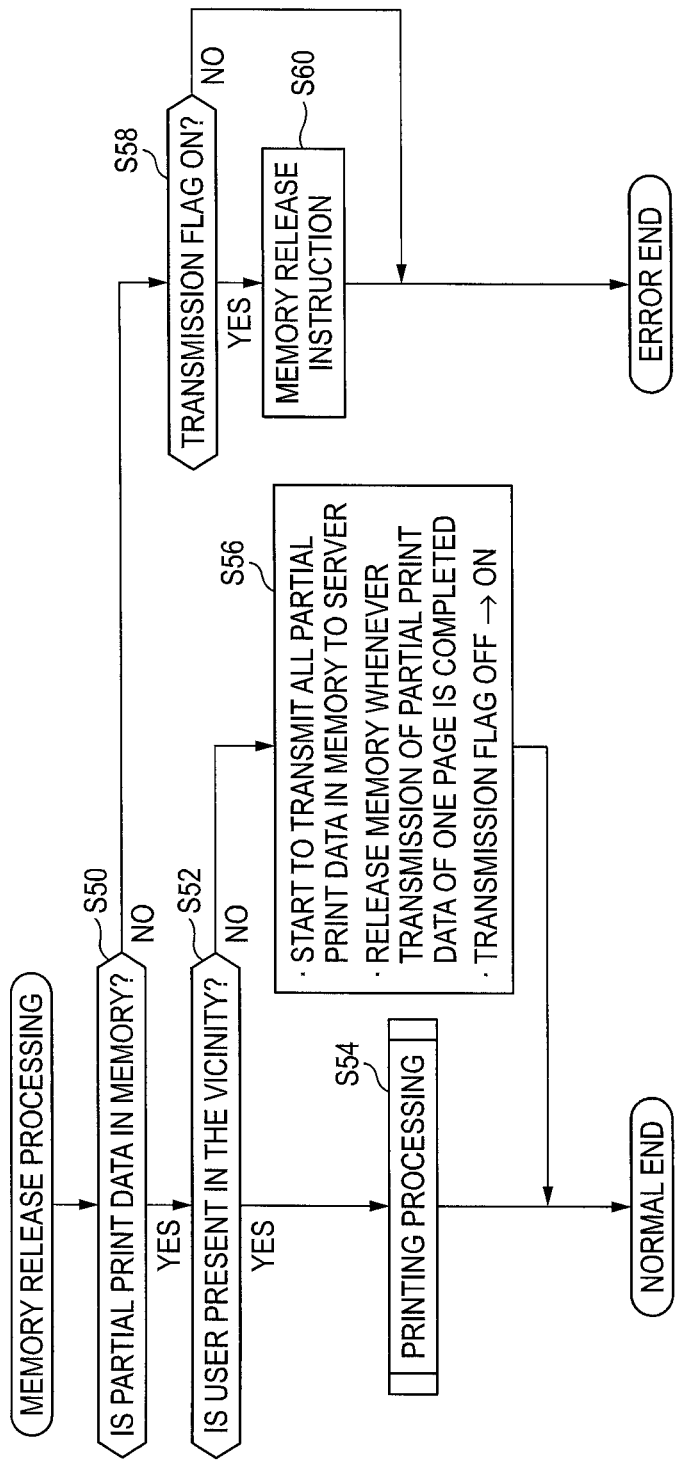
FIG. 4 is a flowchart of memory release processing.

(Memory Release Processing: FIG. 4)

Subsequently, the memory release processing of S30 in FIG. 3 will be described. As shown in FIG. 4, in S50, the generation unit 32 determines whether the partial print data exists in the memory 24. Specifically, when the generated partial print data for which the generation associated with the specific PDL identification information has been completed exists in the memory 24, the generation unit 32 determines 'YES' in S50 and proceeds to S52. On the other hand, when the generated partial print data for which the generation associated with the specific PDL identification information has been completed does not exist in the memory 24, the generation unit 32 determines 'NO' in S50 and proceeds to S58. The case where a result of the determination in S50 is NO, is a case, for example, where the data capacity of the partial PDL data of one page is so large that the memory becomes full (YES in S18 of FIG. 3) while the partial print data of one page is being generated.

In S52, the confirmation unit 36 determines whether the user U1 is present in the vicinity of the printer 10. The processing of S52 is the same as S22 of FIG. 3. When a result of the determination in S52 is YES, the processing proceeds to S54. On the other hand, when a result of the determination in S52 is NO, the processing proceeds to S56.

In S54, the control unit 20 executes the printing processing (refer to FIG. 5). Although specifically described later, when the information indicating 'transmission flag=ON' is stored in the memory 24, the print data acquisition unit 40 starts to acquire all the partial print data from the server 70. Then, the supply unit 34 sequentially supplies the partial print data, which is acquired from the server 70, to the print execution unit 16. The print execution unit 16 executes the printing, based on the partial print data. Further, the supply unit 34 sequentially supplies all the partial print data, which is stored in the memory 24 with being associated with the specific PDL identification information, to the print execution unit 16 in accordance with a sequence of the page numbers indicated by the page information. Whenever the supply of the partial print data of one page is completed, the generation unit 32 releases the area of the memory 24 in which the corresponding partial print data of one page is stored. As a result, the area of the memory 24 in which the partial print data is stored is released. When the processing of S54 is completed, the memory release processing normally ends.

Meanwhile, in S56, the transmission unit 38 starts to transmit all the partial print data in the memory 24 to the server 70. Specifically, in S56, the transmission unit 38 transmits all the partial print data in the memory 24 to the server 70 via the wireless LAN. Incidentally, the page information and the specific PDL identification information are associated with each other in each partial print data that is transmitted here. That is, contrary to S54, the printer 10 (e.g., supply unit 34) does not supply the partial print data in the memory 24 to the print execution unit 16. As a result, it is possible to suppress a printed sheet including an image, which the user U1 wants to print, from being output in a situation where the user U1 is not present in the vicinity of the printer 10. The server 70 stores the respective partial print data in the memory of the server 70.

In S56, whenever the transmission of the partial print data of one page to the server 70 is completed, the generation unit 32 releases the area of the memory 24 in which the corresponding partial print data of one page is stored. When the processing of S56 is completed, the memory release processing normally ends. Further, in S56, when the information indicating 'transmission flag=OFF' is stored in the memory 24, the transmission unit 38 changes the information indicating 'transmission flag=OFF' into the information indicating 'transmission flag=ON.' As described above, in this exemplary embodiment, when the memory becomes full (YES in S18 of FIG. 3) while the partial print data of Nth page is being generated, the printer 10 can appropriately change whether or not to output a printed sheet, depending on whether the user U1 is present in the vicinity of the printer (S54, S56 in FIG. 4).

Therefore, for example, for a case where the memory becomes full (YES in S18 of FIG. 3) while the partial print data of Nth page is being generated, the partial print data in the memory 24 is transmitted to the server 70 in S56, then the partial print data of Nth page is stored in the memory 24 and the memory is again full (YES in S18 of FIG. 3) while the partial print data of (N+1)th page or thereafter is being generated, when the user U1 is present in the vicinity of the printer (YES in S52), the printer 10 can appropriately supply the partial print data transmitted to the server 70 and the partial print data stored in the memory 24 to the print execution unit 16 (S54).

Further, in S58, the transmission unit 38 determines whether the information indicating 'transmission flag=ON' is stored in the memory 24. When a result of the determination in S58 is YES, the print data acquisition unit 40 transmits a memory release instruction to the server 70 via the wireless LAN (S60). The memory release instruction includes the specific PDL identification information. When the memory release instruction is received, the server 70 releases the area of the memory of the server 70, in which all the partial print data associated with the specific PDL identification information is stored. Thereby, regarding a case of the error end, it is possible to suppress the situation in which the respective partial print data still remains in the memory of the server 70. When the processing of S60 is completed, the memory release processing error ends. On the other hand, when a result of the determination in S58 is NO, the processing of S60 is skipped and the memory release processing error ends.

(Printing Processing: FIG. 5)

Subsequently, the printing processing of S24 of FIG. 3 will be described. As shown in FIG. 5, in S80, the transmission unit 38 determines whether the information indicating 'transmission flag=ON' is stored in the memory 24. When a result of the determination in S80 is YES, the processing proceeds to S82. Here, the case where a result of the determination in S80 is YES is a case where the partial print data has been transmitted to the server 70 in S56 of FIG. 4, for example. On the other hand, when a result of the determination in S80 is NO, the processing of S82 to S90 is skipped and the processing proceeds to S92.

In S82, the print data acquisition unit 40 starts to acquire all the partial print data from the server 70. Specifically, in S82, the print data acquisition unit 40 transmits a print data transmission instruction to the server 70 via the wireless LAN. The print data transmission instruction includes the specific PDL identification information. When the print data transmission instruction is received, the server 70 sequentially transmits all the partial print data, which is associated with the specific PDL identification information, of the partial print data stored in the memory of the server 70 to the printer 10 in accordance with a sequence of the page numbers indicated by the page information associated with the respective partial print data. In the respective partial print data, the page information and the specific PDL identification information are associated with each other. The print data acquisition unit 40 starts to sequentially acquire the respective partial print data from the server 70.

When the acquisition of the partial print data starts in S82, the supply unit 34 starts to supply the respective partial print data, which is acquired from the server 70, to the print execution unit 16 in S84. Specifically, in S84, the supply unit 34 sequentially supplies the respective acquired partial print data to the print execution unit 16 in accordance with the sequence of the page numbers indicated by the page information associated with the respective partial print data. Whenever the supply of the partial print data of one page is completed, the generation unit 32 releases an area of the temporary area in the memory 24 where the corresponding partial print data of one page is stored.

When the supply of the partial print data starts in S84, the supply unit 34 monitors in S86 whether the supply of all the partial print data acquired from the server 70 is completed. When the supply of all the partial print data acquired from the server 70 is completed, the supply unit 34 determines 'YES' in S86 and proceeds to S88.

In S88, the print data acquisition unit 40 transmits a memory release instruction to the server 70. The processing of S88 is the same as that of S60 in FIG. 4. Then, in S90, the transmission unit 38 changes the information indicating 'transmission flag=ON' into the information indicating 'transmission flag=OFF.'

In S92, the supply unit 34 determines whether the partial print data exists in the memory 24. The processing of S92 is the same as that of S50 in FIG. 4. Hence, in case of the printing processing that is executed in S54 of FIG. 4, the supply unit 34 determines 'YES' in S92. When a result of the determination in S92 is YES, the processing proceeds to S94. On the other hand, when a result of the determination in S92 is NO, the processing of S94 is skipped and the printing processing is finished.

In S94, the supply unit 34 starts to supply all the partial print data in the memory 24 to the print execution unit 16. Specifically, in S94, the supply unit 34 sequentially supplies the respective partial print data stored in the memory 24 to the print execution unit 16 in accordance with the sequence of the page numbers indicated by the page information associated with the respective partial print data. Also, whenever the supply of the partial print data of one page is completed, the generation unit 32 releases an area of the memory 24, in which the corresponding partial print data of one page is stored (S94). When the processing of S94 is completed, the printing processing ends.

EXAMPLES

Subsequently, a variety of cases of the processing that the printer 10 of this exemplary embodiment executes will be described with reference to FIGS. 6 and 7. Incidentally, 'supply' in FIGS. 6 and 7 indicates the supply of the partial print data to the print execution unit 16. When the partial print data is supplied, the print execution unit 16 prints an image, which is expressed by the corresponding partial print data, on a printing medium.

(Case A: FIG. 6)

Figure 6:
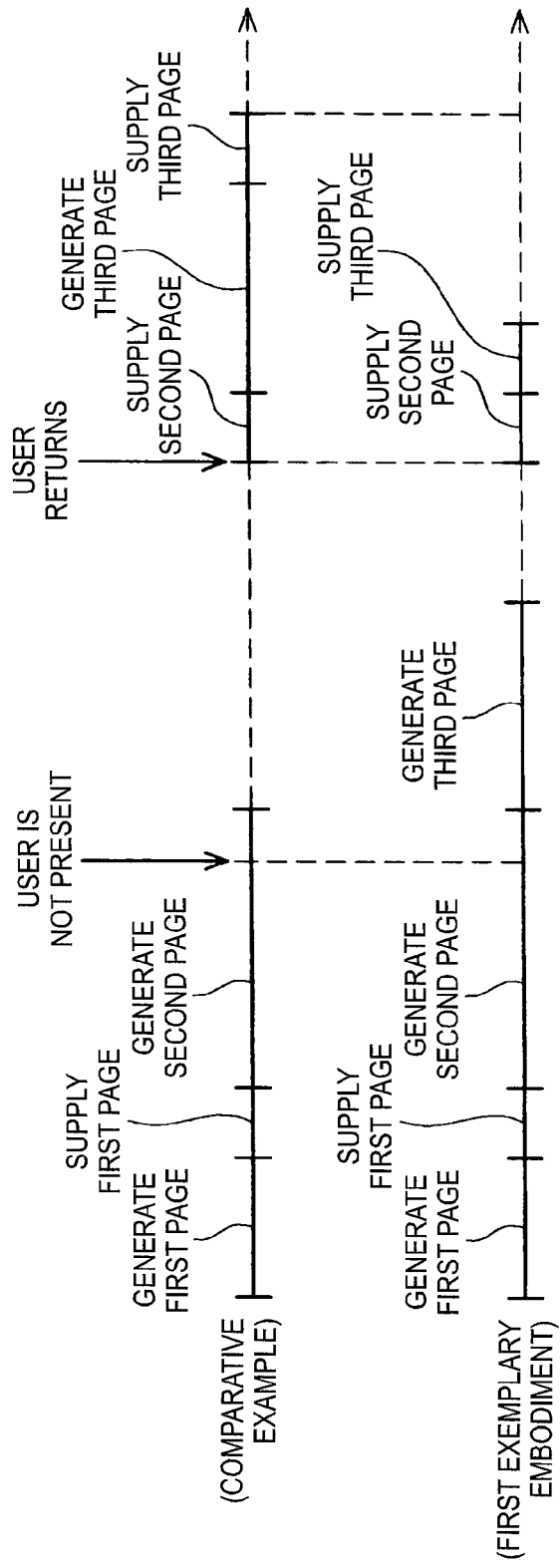
FIG. 6 is a time chart of a case A of a first exemplary embodiment.

A case A shown in FIG. 6 shows an example where the printer 10 of this exemplary embodiment operates when the PDL data including the partial PDL data of three pages is acquired. In the case A, an example is described in which the user is not present in the vicinity of the printer 10 while the partial print data of a second page using the partial PDL data of a second page is being generated. Incidentally, the upper part shows a time chart of an operation of a printer according to a comparative example under same situation, so as to compare this exemplary embodiment. In the case A, the printer of the comparative example and the printer 10 of this exemplary embodiment execute the so-called sequential processing, respectively. That is, the printer of the comparative example and the printer 10 of this exemplary embodiment adopt the configuration of supplying the partial print data of a first page after the generating processing of the partial print data of a first page using the partial PDL data of a first page is completed, and after the supplying is completed, generating processing of the partial print data of a second page using the partial PDL data of a second page is started.

When it is confirmed that the user is present in the vicinity of the printer after the generating processing of the partial print data of a first page is completed, the printer of the comparative example supplies the partial print data of a first page to the print execution unit. When the supply of the partial print data of a first page is completed, the printer of the comparative example starts to generate the partial print data of a second page. In the case A, the user is not present in the vicinity of the printer while the partial print data of a second page is being generated. The printer of the comparative example does not supply the partial print data of a second page to the print execution unit unless it is confirmed that the user is present in the vicinity of the printer. Also, the printer of the comparative example does not start to generate the partial print data of a third page unless it is confirmed that the user is present in the vicinity of the printer. After that, when it is confirmed that the user is present in the vicinity of the printer, the printer of the comparative example supplies the partial print data of a second page to the print execution unit. Then, the printer of the comparative example starts to generate the partial print data of a third page after the supply of the partial print data of a second page is completed.

Compared to the comparative example, according to the printer 10 of this exemplary embodiment, when it is confirmed that the user U1 is not present in the vicinity of the printer 10 (NO in S22 and NO in S32 of FIG. 3) upon the completion of the generating processing of the partial print data of a second page, the printer 10 continues to generate the partial print data of a third page using the partial PDL data of a third page (S16). The printer 10 does not supply the partial print data of a second page to the print execution unit 16 unless it is confirmed that the user U1 is present in the vicinity of the printer. Therefore, it is possible to suppress a printed sheet including an image, which the user U1 wants to print, from being output in a situation where the user U1 is not present in the vicinity of the printer 10. When it is confirmed that the user U1 is present in the vicinity of the printer 10 after the generating processing of the partial print data of a third page is completed (YES in S32, NO in S34 and YES in S22 of FIG. 3), the printer 10 sequentially supplies the partial print data of a second page and the partial print data of a third page in the memory 24 to the print execution unit 16. Hence, the printer 10 can appropriately supply the partial print data of a second page and the partial print data of a third page to the print execution unit 16 in accordance with an appropriate order.

As described above, contrary to the printer of the comparative example, the printer 10 of this exemplary embodiment is able to start to generate the partial print data of a third page before it is confirmed that the user returns to the vicinity of the printer 10 after the user is not present in the vicinity of the printer 10 (NO in S22 and NO in S32 of FIG. 3). Hence, after it is confirmed that the user returns to the vicinity of the printer 10, the printer 10 has only to sequentially supply the generated partial print data of second and third pages to the print execution unit 16. Therefore, as can be understood from the two charts of FIG. 6, the printer 10 of this exemplary embodiment can rapidly supply the partial print data of a third page to the print execution unit 16, compared to the printer of the comparative example. As a result, the printer 10 of this exemplary embodiment can rapidly provide a printed sheet to the user, compared to the printer of the comparative example.

(Case B: FIG. 7)

Figure 7:
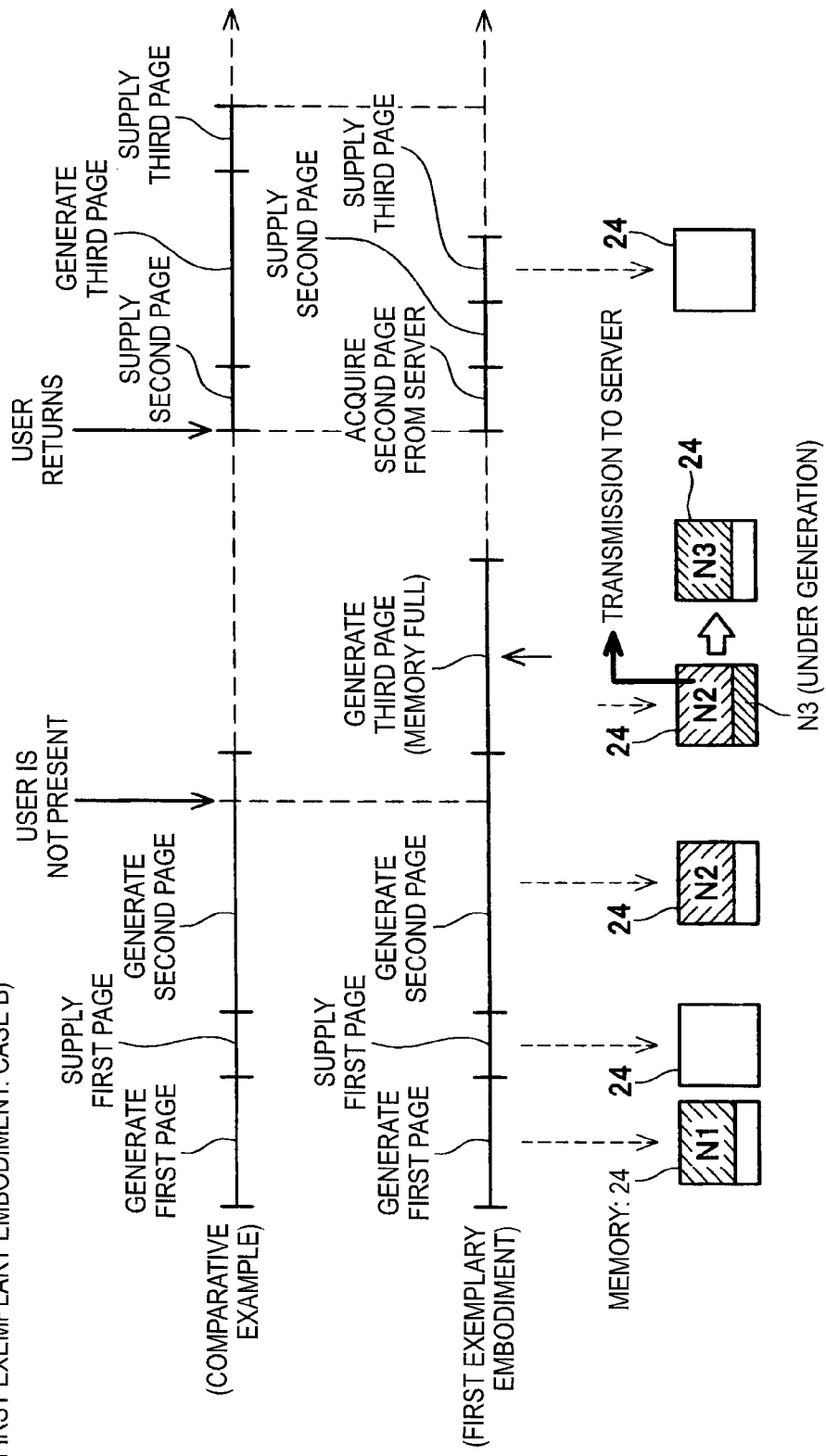
FIG. 7 is a time chart of a case B of the first exemplary embodiment.

A case B shown in FIG. 7 also shows an example where the printer 10 of this exemplary embodiment operates when the PDL data including the partial PDL data of three pages is acquired. In the case B, an example is described in which the memory is full while the partial print data of a third page using the partial PDL data of a third page is being generated. Like the case A, the upper part shows a comparative example. Also in the case B, the printer of the comparative example and the printer 10 of this exemplary embodiment execute the so-called sequential processing, respectively.

Since the operations of the printer of the comparative example are the same as those of the case A, the descriptions thereof are omitted. In the printer 10 of this exemplary embodiment, when the generating processing of the partial print data of a first page using the partial PDL data of a first page is completed, the partial print data N1 of a first page is stored in the memory 24 (YES in S20 of FIG. 3). At this time, since the user U1 is present in the vicinity of the printer 10 (YES in S22 of FIG. 3), the printer 10 supplies the partial print data N1 of a first page to the print execution unit 16 and releases the memory 24 (S24 in FIG. 3, S94 in FIG. 5).

Then, the printer 10 starts to generate the partial print data of a second page using the partial PDL data of a second page. In the case B, the user U1 is not present in the vicinity of the printer 10 while the partial print data of a second page is being generated. When the generating processing of the partial print data of a second page is completed, the partial print data N2 of a second page is stored in the memory 24 (YES in S20 of FIG. 3). When it is confirmed that the user U1 is not present in the vicinity of the printer 10 (NO in S22 and NO in S32 of FIG. 3) upon the completion of the generating processing of the partial print data of a second page, the printer 10 of this exemplary embodiment continues to generate the partial print data of a third page using the partial PDL data of a third page (S16). Also in the case B, the printer 10 does not supply the partial print data of a second page to the print execution unit 16 unless it is confirmed that the user U1 is present in the vicinity of the printer 10. Therefore, it is possible to suppress a printed sheet including an image, which the user U1 wants to print, from being output in a situation where the user U1 is not present in the vicinity of the printer 10. In the case B, the available space of the memory 24 becomes a predetermined threshold value or smaller (the memory is full. YES in S18 of FIG. 3) while the partial print data of the third page is being generated. In this case, the printer 10 transmits the partial print data N2 of a second page stored in the memory 24 to the server 70 and releases the area of the memory 24 (S56 in FIG. 4) where the partial print data N2 is stored. Thereby, the printer 10 can appropriately release the area of the memory 24 to thus appropriately generate the partial print data N3 in the memory 24. Then, the printer 10 generates and stores the partial print data N3 of a third page in the released memory 24.

When it is confirmed that the user U1 is present in the vicinity of the printer 10 after the generating processing of the partial print data of a third page is completed (YES in S32, NO in S34 and YES in S22 of FIG. 3), the printer 10 first acquires the partial print data N2 of a second page from the server 70 and supplies the same to the print execution unit 16 (YES in S80 and S82, S84 of FIG. 5). Then, the printer 10 supplies the partial print data N3 of a third page in the memory 24 to the print execution unit 16 and releases the memory 24 (S94 in FIG. 5). Hence, the printer 10 can appropriately supply the partial print data of second and third pages to the print execution unit 16 in accordance with an appropriate order when it is confirmed that the user is present in the vicinity of the printer 10 after the partial print data N2 of a second page is transmitted to the server 70.

As described above, the memory of the printer 10 of this exemplary embodiment becomes full while the partial print data of a third page is being generated (YES in S18 of FIG. 3). Even in this case, as described above, it is possible to continue to generate the partial print data of a third page by transmitting the partial print data N2 of a second page in the memory 24 to the server 70 (S56 in FIG. 4). Hence, the printer 10 does not need to execute the generating processing after it is confirmed that the user returns to the vicinity of the printer 10 and has only to supply the generated partial print data of second and third pages. Therefore, compared to the printer of the comparative example, it is possible to rapidly supply the partial print data of second and third pages to the print execution unit 16. As a result, the printer 10 of this exemplary embodiment can rapidly provide a printed sheet to the user, compared to the printer of the comparative example.

Incidentally, the specific PDL data is an example of the 'original data.' The terminal ID 'D50' is an example of the 'identification information.' The partial PDL data of Nth page and the partial print data of Nth page are examples of the 'partial original data' and the 'partial print data', respectively. The partial print data of a second page and the partial print data of a third page in FIG. 6 are examples of the 'first partial print data' and the 'second partial print data', respectively.

The case where a result of the determination in S22 of FIG. 3 is YES and the case where a result of the determination in S22 is NO are examples of the 'first situation' and the 'second situation', respectively. The case where a result of the first determination in S22 of FIG. 3 is NO and a result of the second determination in S22 is YES is an example of the 'specific case.' The case where a result of the determination in S18 of FIG. 3 is YES, a result of the determination in S50 of FIG. 4 is YES and a result of the determination in S52 is YES is an example of the 'first case.' The case where a result of the determination in S18 of FIG. 3 is YES, a result of the determination in S50 of FIG. 4 is YES and a result of the determination in S52 is NO is an example of the 'second case.' The case where a result of the determination in S22 of FIG. 3 is YES and a result of the determination in S80 of FIG. 5 is YES after executing the processing of S56 in FIG. 4 is an example of the 'third case.' It is assumed a situation when the memory becomes full (YES in S18 of FIG. 3) while the partial print data of Nth page is being generated, the partial print data in the memory 24 is transmitted to the server 70 (S56 in FIG. 4), then the partial print data of Nth page is stored in the memory 24 and the memory is again full (YES in S18 of FIG. 3) while the partial print data of (N+1)th page or thereafter is being generated. Here, a case where the user U1 is present in the vicinity of the printer 10 in this situation (YES in S52 of FIG. 4) is an example of the 'fourth case.' Also, in this case, the partial PDL data of (N+1)th page or thereafter is an example of the 'third partial print data.'

(Second Exemplary Embodiment)

Second exemplary embodiment will be described. Here, different points from the first exemplary embodiment will be described. In this second exemplary embodiment, the control unit 20 of the printer 10 executes so-called random processing. That is, in this exemplary embodiment, the printer 10 is able to execute the generating processing of the partial print data and the supply of the partial print data at the same time. Therefore, in this exemplary embodiment, in S24 of FIG. 3, when the printing processing (refer to FIG. 5) starts, the control unit 20 proceeds to S26 without waiting for the ending of the printing processing. That is, in S26, the supply unit 34 can start the generating processing of the partial print data of a next page without waiting for the completion of the supply of all the partial print data in the server 70 or memory 24.

Figure 8:
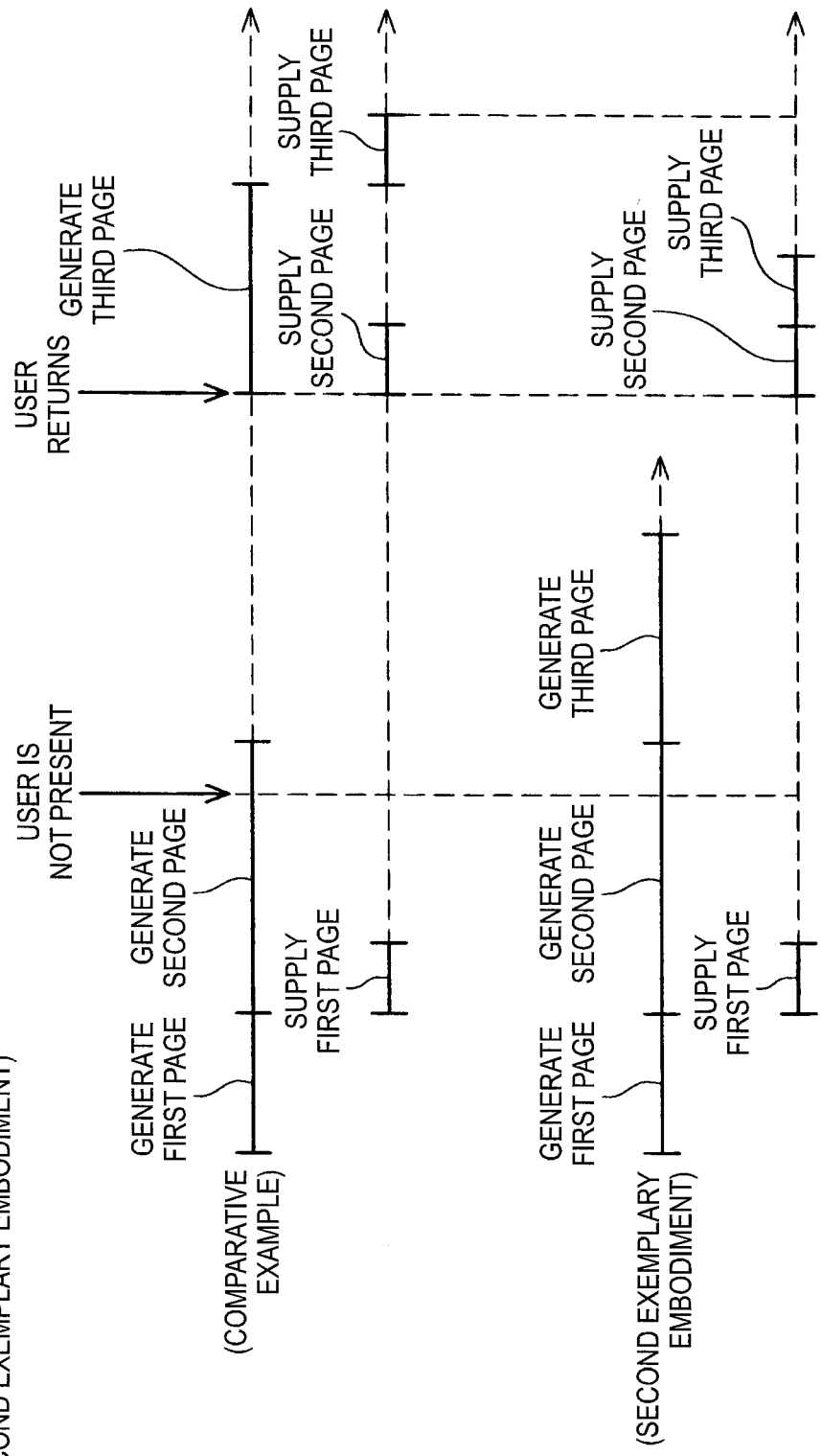
FIG. 8 is a time chart of a second exemplary embodiment.

Example: FIG. 8

Subsequently, an example of the processing that the printer 10 of this second exemplary embodiment executes will be described with reference to FIG. 8. A specific example shown in FIG. 8 shows an example where the printer 10 of this exemplary embodiment operates when the PDL data including the partial PDL data of three pages is acquired. In this specific example, an example is described in which the user is not present in the vicinity of the printer 10 while the partial print data of a second page using the partial PDL data of a second page is being generated. Incidentally, also in this specific example, the upper part shows a time chart of an operation of a printer according to a comparative example under same situation, so as to compare this exemplary embodiment. The printer of the comparative example is a printer having the related-art configuration. In this specific example, the printer of the comparative example and the printer 10 of this exemplary embodiment execute the so-called random processing, respectively.

When it is confirmed that the user is present in the vicinity of the printer after the generating processing of the partial print data of a first page is completed, the printer of the comparative example supplies the partial print data of a first page to the print execution unit. The printer of the comparative example starts to generate the partial print data of a second page while supplying the partial print data of a first page to the print execution unit. In this example, the user is not present in the vicinity of the printer while the partial print data of a second page is being generated. The printer of the comparative example is unable to supply the generated partial print data of a second page to the print execution unit unless it is confirmed that the user is present in the vicinity of the printer. Also, the printer of the comparative example does not start to generate the partial print data of a third page unless it is confirmed that the user is present in the vicinity of the printer. After that, when it is confirmed that the user is present in the vicinity of the printer, the printer of the comparative example supplies the generated partial print data of a second page to the print execution unit. At the same time, the printer 10 also starts to generate the partial print data of a third page. In the printer of the comparative example, the generating processing of the partial print data of a third page has not been completed yet upon the completion of the supply of the partial print data of a second page. Therefore, the printer of the comparative example should wait for the completion of the generating processing of the partial print data of a third page and then supply the partial print data of a third page to the print execution unit.

In contrast, when it is confirmed that the user U1 is not present in the vicinity of the printer 10 (NO in S22 and NO in S32 of FIG. 3) upon the completion of the generating processing of the partial print data of a second page using the partial PDL data of a second page, the printer 10 of this exemplary embodiment continues to generate the partial print data of a third page using the partial PDL data of a third page (S16). The printer 10 stores the generated partial print data of second and third pages in the memory 24. The printer 10 does not supply the generated partial print data of a second page to the print execution unit 16 unless it is confirmed that the user U1 is present in the vicinity of the printer. When it is confirmed that the user is present in the vicinity of the printer 10 after the generating processing of the partial print data of a third page is completed (YES in S32, NO is S34 and YES in S22 of FIG. 3), the printer 10 sequentially supplies the partial print data of a second page and the partial print data of a third page in the memory 24 to the print execution unit 16.

The printer 10 of this exemplary embodiment is able to start to generate the partial print data of a third page using the partial PDL data of a third page before it is confirmed that the user returns to the vicinity of the printer 10 after the user is not present in the vicinity of the printer 10 (NO in S22 and NO in S32 of FIG. 3), contrary to the printer of the comparative example. Hence, after it is confirmed that the user returns to the vicinity of the printer 10, the printer 10 has only to sequentially supply the generated partial print data of second and third pages to the print execution unit 16. Therefore, as can be understood from the two charts of FIG. 8, the printer 10 of this exemplary embodiment can rapidly supply the partial print data of a third page to the print execution unit 16, compared to the printer of the comparative example. As a result, the printer 10 of this exemplary embodiment can rapidly provide a printed sheet to the user, compared to the printer of the comparative example.

Although the specific embodiments of the invention have been specifically described, the embodiments are just exemplary and do not limit the claims. The technology defined in the claims includes a variety of modification and changes to the above embodiments. Modifications to the above-described exemplary embodiments will be described as follows.

(First Modified Embodiment)

In S22 of FIG. 3, the confirmation unit 36 may confirm whether the user U1 is present in the vicinity of the printer 12 by the other arbitrary methods. For example, when the user U1 operates the operation unit 12 of the printer 10 to thus input a predetermined PIN code, the confirmation unit 36 may determine that the user U1 is present in the vicinity of the printer 12. Further, for example, the printer 10 may have a fingerprint reader. When a fingerprint of the user U1 is read by the fingerprint reader, the confirmation unit 36 may determine that the user U1 is present in the vicinity of the printer 12. Still further, for example, the printer 10 may have a card reader. When a predetermined recognition card carried by the user U1 is read by the card reader, the confirmation unit 36 may determine that the user U1 is present in the vicinity of the printer 12. Generally speaking, the confirmation unit has only to confirm whether a specific user is present in the vicinity of the printer.

(Second Modified Embodiment)

In the second exemplary embodiment, for example, the generation unit 32 starts to generate the partial print data of a second page using the partial PDL data of a second page while the partial print data of a first page is being supplied to the print execution unit 16. Therefore, the generation unit 32 can complete the generating processing of the partial print data of a second page while the partial print data of a first page is being supplied to the print execution unit 16. In this case, the generation unit 32 starts to generate the partial print data of a third page after the partial print data of a first page is supplied to the print execution unit 16. In this modified embodiment, the partial print data of a first page and the partial print data of a third page are examples of the 'first partial print data' and the 'second partial print data', respectively. Generally speaking, the 'first partial print data' and the 'second partial print data' are not limited to the partial print data of two continuing pages. That is, the 'second partial print data' may be data that should be generated later than the 'first partial print data.'

(Third Modified Embodiment)

In S10 of FIG. 3, the original data acquisition unit 30 may acquire data, other than the PDL. Hence, for example, the original data acquisition unit may acquire data having a JPEG format, data of a webpage, RGB bitmap data and the like. In this exemplary embodiment, the data having a JPEG format and the like is an example of the 'original data.' When the original data acquisition unit 30 acquires RGB bitmap data in S10 of FIG. 3, the processing of S16 is processing of converting the RGB bitmap data into CMYK bitmap data and converting the CMYK bitmap data into binary data. In this modified embodiment, the above respective processing is an example of the 'conversion.'

(Fourth Modified Embodiment)

In S84 and S94 of FIG. 5, the generation unit 32 may release the area of the memory 24 in which all the partial print data is stored, after the supply of all the partial print data in the memory 24 to the print execution unit 16 is completed. Generally speaking, the generation unit has only to release an area in the memory in which the first partial print data is stored, after the first partial print data is supplied to the print execution unit. Likewise, in S56 of FIG. 4, the generation unit 32 may release the area in the memory 24 in which all the partial print data is stored, after the transmission of all the partial print data in the memory 24 to the server 70 is completed. Generally speaking, the generation unit has only to release an area in the memory in which the first partial print data is stored, after the first partial print data is transmitted to the server.

(Fifth Modified Embodiment)

In the above-described exemplary embodiments, the CPU 22 of the printer 10 is configured to execute the processing in response to the software, so as to implement the respective units of the original data acquisition unit 30, the generation unit 32, the supply unit 34, the confirmation unit 36, the transmission unit 38 and the print data acquisition unit 40. Alternatively, at least a part of the respective units 30 to 40 may be implemented by hardware such as logical circuit.

The technical elements illustrated in the specification or drawings exhibit the technical availability individually or by a variety of combinations thereof and are not limited to the combinations defined in the claims at the time of filing the application. Also, the technology exemplified in the specification or drawings achieves a plurality of purposes at the same time and the achievement of any one purpose has the technical availability.

What is claimed is:

1. A printer comprising:
   a print execution unit configured to execute a printing operation; and
   a control device configured to operate as:
      an original data acquisition unit configured to acquire original data, which is designated as a print target by a specific user and comprises identification information for identifying the specific user;
      a generation unit configured to sequentially convert each of partial original data of a plurality of pages included in the original data so as to sequentially generate each of partial print data of the plurality of pages in a memory of the printer, each of the partial print data being one page of the data to be printed;
      a supply unit configured to sequentially supply each of the partial print data of the plurality of pages sequentially generated in the memory to the print execution unit; and
      a confirmation unit configured to confirm whether the specific user is present in the vicinity of the printer by using the identification information after a first partial print data of one page is generated in the memory,
   wherein the supply unit is configured to supply the first partial print data which is stored in the memory to the print execution unit, and
   the generation unit is configured to generate second partial print data in the memory after the first partial print data is supplied to the print execution unit, the second partial print data being partial print data of one page different from the first partial print data and being generated later than the first partial print data, in response to the specific user being confirmed as being present in the vicinity of the printer and
   wherein the supply unit is configured not to supply the first partial print data which is stored in the memory to the print execution unit, and
   the generation unit is configured to generate the second partial print data in the memory in response to the specific user not being confirmed as being present in the vicinity of the printer,
   wherein the supply unit is configured to supply each of the first partial print data and the second partial print data which is stored in the memory to the print execution unit after the generation of the second partial print data is completed in memory in response to the specific user being confirmed as being present in the vicinity of the printer after the specific user being confirmed as not being present in the vicinity of the printer when the generation of the first partial print data is completed in the memory;
   wherein the confirmation unit is configured to determine that it is confirmed that the specific user is present in the vicinity of the printer when it is possible to communicate by short distance wireless communication with a mobile terminal carried by the specific user, and
   wherein the confirmation unit is configured to determine that it is not confirmed that the specific user is present in the vicinity of the printer when it is not possible to perform the short distance wireless communication with the mobile terminal.

2. The printer according to claim 1,
   wherein the supply unit is configured to supply the second partial
   print data to the print execution unit after supplying the first partial print data to the print execution unit.

3. The printer according to claim 1,
   wherein the confirmation unit is further configured to confirm whether the specific user is
   present in the vicinity of the printer when an available space in the memory becomes a predetermined threshold value or smaller while each of the partial print data of the plurality of pages is sequentially generated in the memory,
   wherein in a first case where it is confirmed that the specific user is present in the vicinity of the printer when the available space in the memory becomes the predetermined threshold value or smaller while the second partial print data is being generated in the memory,
   the supply unit is configured to supply the first partial print data which is stored in the memory to the print execution unit, and
   the generation unit is configured to release an area in the memory, in which the first partial print data is stored, after the first partial print data is supplied to the print execution unit, and then continue to generate the second partial print data in the memory, and
   wherein in a second case where it is not confirmed that the specific user is present in the vicinity of the printer when the available space in the memory becomes the predetermined threshold value or smaller while the second partial print data is being generated in the memory,
   the supply unit is configured not to supply the first partial print data which is stored in the memory to the print execution unit.

4. The printer according to claim 3,
   wherein the control device is further configured to operate as a transmission unit configured to transmit the first partial print data which is stored in the memory to a server, which is separately configured from the printer, in the second case, and
   wherein the generation unit is configured to release the area in the memory in which the first partial print data is stored, after the first partial print data is transmitted to the server, and then generate the second partial print data in the memory.

5. The printer according to claim 4,
   wherein the control device is further configured to operate as a print data acquisition unit configured to acquire the first partial print data from the server, in a third case where it is confirmed that the specific user is present in the vicinity of the printer when the second partial print data is generated in the memory after the first partial print data is transmitted to the server, and wherein in the third case, the supply unit is configured to supply each of the first partial print data which is acquired from the server and the second partial print data which is stored in the memory to the print execution unit.

6. The printer according to claim 5, wherein in the third case, the supply unit is configured to supply the second partial print data to the print execution unit after supplying the first partial print data to the print execution unit.

7. The printer according to claim 4, wherein the control device is further configured to operate as a print data acquisition unit configured to acquire the first partial print data from the server, in a fourth case where it is not confirmed that the specific user is present in the vicinity of the printer when the second partial print data is generated in the memory after the first partial print data is transmitted to the server, and it is confirmed that the specific user is present in the vicinity of the printer when the available space in the memory becomes the predetermined threshold value or smaller while third partial print data that is the partial print data of one page different from the second partial print data and to be generated later than the second partial print data is being generated in the memory, and wherein in the fourth case, the supply unit is configured to supply each of the first partial print data which is acquired from the server and the second partial print data which is stored in the memory to the print execution unit.

8. The printer according to claim 7, wherein in the fourth case, the supply unit is configured to supply the second partial print data to the print execution unit after supplying the first partial print data to the print execution unit.

9. The printer according to claim 1, wherein the short distance wireless communication is at least one of Bluetooth, infrared communication and NFC.

10. A non-transitory computer-readable medium having a computer program stored thereon that, when executed by a computer, causes the computer to perform operations comprising:

original data acquisition processing of acquiring original data, which is designated as a print target by a specific user and comprises identification information for identifying the specific user;

generation processing of sequentially converting each of partial original data of a plurality of pages included in the original data so as to sequentially generate each of partial print data of the plurality of pages in a memory of the printer, each of the partial print data being a part of the data to be printed;

supply processing of sequentially supplying each of the partial print data of the plurality of pages sequentially generated in the memory to a print execution unit; and confirmation processing of confirming whether the specific user is present in the vicinity of the printer by using the identification information after a first partial print data of one page is generated in the memory, wherein in the supply processing, the computer program causes the computer to supply the first partial print data which is stored in the memory to the print execution unit, and in the generation processing, the computer program causes the computer to generate second partial print data in the memory after the first partial print data is supplied to the print execution unit, the second partial print data being partial print data of one page different from the first partial print data and being generated later than the first partial print data, in response to the specific user being confirmed as being present in the vicinity of the printer, and wherein in supply processing, the computer program causes the computer not to supply the first partial print data which is stored in the memory to the print execution unit, and in the generation processing, the computer program causes the computer to generate the second partial print data in the memory, in response to the specific user not being confirmed as being present in the vicinity of the printer;

wherein in supply processing, the computer program causes the computer to supply each of the first partial print data and the second partial print data which is stored in the memory to the print execution unit after the generation of the second partial print data is completed in memory in response to the specific user being confirmed as being present in the vicinity of the printer after the specific user being confirmed as not being resent in the vicinity of the printer when the generation of the first partial print data is completed in the memory;

wherein in confirmation processing, the computer program causes the computer to determine that it is confirmed that the specific user is present in the vicinity of the printer when it is possible to communicate by short distance wireless communication with a mobile terminal carried by the specific user, and wherein in confirmation processing, the computer program causes the computer to determine that it is not confirmed that the specific user is present in the vicinity of the printer when it is not possible to perform the short distance wireless communication with the mobile terminal.

* * * * *